United States Patent
Lee et al.

(10) Patent No.: US 12,045,813 B2
(45) Date of Patent: Jul. 23, 2024

(54) METHOD AND APPARATUS FOR BLOCKCHAINS WITH MODIFIABLE RECORDED TRANSACTIONS

(71) Applicant: INJE UNIVERSITY INDUSTRY-ACADEMIC COOPERATION FOUNDATION, Gyeongsangnam-do (KR)

(72) Inventors: Nam Yong Lee, Gyeongsangnam-do (KR); Chul Soo Kim, Gyeongsangnam-do (KR); Jinhong Yang, Gyeongsangnam-do (KR)

(73) Assignees: INJE UNIVERSITY INDUSTRY-ACADEMIC COOPERATION FOUNDATION, Gyeongsangnam-Do (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 310 days.

(21) Appl. No.: 16/584,041

(22) Filed: Sep. 26, 2019

(65) Prior Publication Data
US 2020/0234293 A1  Jul. 23, 2020

(30) Foreign Application Priority Data

Jan. 22, 2019 (KR) .......................... 10-2019-0008301
Mar. 25, 2019 (KR) .......................... 10-2019-0033315
(Continued)

(51) Int. Cl.
G06Q 20/38 (2012.01)

(52) U.S. Cl.
CPC ..... *G06Q 20/389* (2013.01); *G06Q 20/38215* (2013.01); *G06Q 20/3825* (2013.01); *G06Q 20/3827* (2013.01); *G06Q 2220/127* (2013.01)

(58) Field of Classification Search
None
See application file for complete search history.

(56) References Cited

U.S. PATENT DOCUMENTS 10,846,762 B1 * 11/2020 Dennis ................. G06Q 20/065
2019/0205563 A1 * 7/2019 Gonzales, Jr. ......... G06Q 40/08
(Continued)

FOREIGN PATENT DOCUMENTS

KR       20170059270   *  5/2017
KR       1020180124541    11/2018

OTHER PUBLICATIONS

OAS, for the Renaissance of Blockchain & IoT, White Paper, version 2.2, released on Sep. 15, 2018. http://vidfolio.kr/wp-content/uploads/2018/10/OAS_whitepaper_v2.pdf.
(Continued)

*Primary Examiner* — Neha Patel
*Assistant Examiner* — Nicholas K Phan
(74) *Attorney, Agent, or Firm* — Grogan, Tuccillo & Vanderleeden, LLP

(57) ABSTRACT

Disclosed herein are method and system for modifying transactions already recorded on blockchains. The method for managing transactions based on blockchains may include a process for proceeding with mining blocks by separating approval and modification of transactions by using transaction approval block for proving approval of transactions and transaction modification block for proving modification of transactions.

2 Claims, 15 Drawing Sheets

(30) Foreign Application Priority Data

Apr. 24, 2019 (KR) ........................ 10-2019-0047725
Apr. 24, 2019 (KR) ........................ 10-2019-0047726

(56) References Cited

U.S. PATENT DOCUMENTS

| | | | |
|---|---|---|---|
| 2019/0303622 A1* | 10/2019 | Versteeg | ................... H04L 9/50 |
| 2019/0354944 A1* | 11/2019 | Russinovich | ........ G06Q 20/065 |
| 2019/0384932 A1* | 12/2019 | Pratt | ..................... H04W 12/61 |
| 2020/0019931 A1* | 1/2020 | Prabhakar | ............. H04L 63/102 |
| 2020/0097927 A1* | 3/2020 | Groarke | ............. G06Q 20/0658 |
| 2020/0174813 A1* | 6/2020 | Jain | ....................... G06F 9/4868 |

OTHER PUBLICATIONS

Han, "Introduction to Bitcoin Blockchain", Dec. 21, 2016.
Korean Office Action issued on May 25, 2020 in corresponding to Korean patent Application No. 10-2019-0033315.
Korean Office Action issued on May 25, 2020 in corresponding to Korean patent Application No. 10-2019-0047725.

\* cited by examiner

FIG. 1

| Symbol | Content |
|---|---|
| $h^{[n-1]}$ | Hash value of right preceding block |
| M | Coefficient determining difficulty of Equation 1 |
| $c^{[n]}$ | The number of transactions |
| $r^{[n]}$ | Nonce Value of hash puzzle of block |
| $h^{[n]}$ | Hash value of block |
| $t_i^{[n]}$ | Transaction i, i = 1,..., $c^{[n]}$ |
| $MT^{[n]}$ | Merkle Tree information for transaction $t_i^{[n]}$, i = 1,..., $c^{[n]}$ |

FIG. 2

| Symbol | Content |
|---|---|
| $f_i^{[n]}$ | $t_i^{[n]}$'s state = approval, modification |
| $MB_i^{[n]}$ | Information for interested parties who may request modification of transaction |
| $m_i^{[n]}$ | Contents of transaction $t_i^{[n]}$ |
| $\tilde{m}_i^{[n]}$ | Additional data for proof-of-work for modification of transaction $t_i^{[n]}$ |

FIG. 3

| Symbol | Content |
|---|---|
| status | 0( 'Transaction approval' ) |
| $h^{[n-1]}$ | Hash value of right preceding block |
| M | Coefficient determining difficulty of Equation 7 |
| K | Coefficient determining difficulty of transaction modification of Equation 4 |
| pk | Public key of miner |
| $c^{[n]}$ | The number of transactions |
| $r^{[n]}$ | Hash puzzle nonce value of block; Equation 7 |
| $h^{[n]}$ | Hash value of block |
| $t_i^{[n]}$ | Transaction i, i = 1,..., $c^{[n]}$ |
| $MT^{[n]}$ | Merkle Tree information for transaction $t_i^{[n]}$, i = 1,..., $c^{[n]}$ |
| $w_i^{[n]}$ | Target value Equation 4, i = 1,..., $c^{[n]}$ |
| $S_w$ | Signature of miner for target value Equation 6 |

FIG. 4

| Symbol | Content |
|---|---|
| status | 1( 'Transaction modification' ) |
| $h^{[n-1]}$ | Hash value of right preceding block |
| K | Coefficient determining difficulty of transaction modification of Equation 4 |
| pk | Public key of miner |
| $r^{[n]}$ | Hash puzzle nonce value of block; Equation 8 |
| $h^{[n]}$ | Hash value of block |
| $w_j^{[n*]}$ | Target value of transaction requested to be modified $t_j^{[n*]}$ |
| $p_j^{[n*]}$ | Target value of transaction requested to be modified $t_j^{[n*]}$ |
| TMC | Transaction modification command |
| $S_{TMC}$ | Signature of miner for TMC |

FIG. 6

| Symbol | Content |
|---|---|
| $h^{[n-1]}$ | Hash value of right preceding block |
| M | Coefficient determining difficulty of Equation 11 |
| pk | Public key of miner |
| $c^{[n]}$ | The number of transactions |
| $K_i^{[n]}$ | Coefficient i, i=1, ... , $c^{[n]}$ determining difficulty of transaction modification of Equation 10 |
| $r^{[n]}$ | Hash puzzle nonce value of block; Equation 19 |
| $h^{[n]}$ | Hash value of block |
| $t_i^{[n]}$ | Transaction i, i = 1,..., $c^{[n]}$ |
| $MT^{[n]}$ | Merkle information for transaction $t_i^{[n]}$, i = 1, ... , $c^{[n]}$ |
| $w_i^{[n]}$ | Equation 10, i = 1,...,$c^{[n]}$ |
| $S_w$ | Signature of miner for target value Equation 6 |

FIG. 7

| Symbol | Content |
|---|---|
| $h^{[id,k-1]}$ | Hash value of right preceding block |
| pk | Public key of miner |
| $\lambda^{[id,n,k]}$ | Hash puzzle nonce value of block; Equation 13 |
| $\mu^{[id,n,k]}$ | Hash value of block; $\mu^{[id,n,k]} = H(h^{[n^*-1]} \| \mu^{[id,n,k-1]} \| \lambda^{[id,n,k]} \| p_j^{[n^*]})$ |
| $w_j^{[n^*]}$ | Target value of transaction requested to be modified $t_j^{[n^*]}$ |
| $p_j^{[n^*]}$ | Modification content of transaction requested to be modified $t_j^{[n^*]}$ |
| TMC | Transaction modification command |
| $S_{TMC}$ | Signature of miner for TMC |

FIG. 12

| Symbol | Content |
|---|---|
| $f_i^{[n]}$ | $t_i^{[n]}$'s state = approval, modification, command |
| $MB_i^{[n]}$ | Information of interested party who may request modification of transaction $t_i^{[n]}$ |
| $m_i^{[n]}$ | Content of transaction $t_i^{[n]}$ |
| $\tilde{m}_i^{[n]}$ | Additional data for proof-of-work for modification of transaction $t_i^{[n]}$ |

FIG. 13

| Symbol | Content |
|---|---|
| $h^{[n-1]}$ | Hash value of right preceding block |
| M | Coefficient determining difficulty of Equation 7 |
| K | Coefficient determining difficulty of transaction modification of Equation 4 |
| pk | Public key of miner |
| $c^{[n]}$ | The number of transactions |
| $r^{[n]}$ | Hash puzzle nonce value of block; Equation 7 |
| $h^{[n]}$ | Hash value of block |
| $t_i^{[n]}$ | Transaction i, i = 1,...,$c^{[n]}$ |
| $MT^{[n]}$ | Merkle Tree information for transaction $t_i^{[n]}$, i = 1,...,$c^{[n]}$ |
| $w_i^{[n]}$ | Target value Equation 4, i = 1,...,$c^{[n]}$ |
| $S_w$ | Signature of miner for target value Equation 6 |

FIG. 14

| Symbol | Content |
| --- | --- |
| $pk^*$ | Public key of interested party of transaction requested to be modified $t_j^{[n^*]}$ |
| $r_j^{[n]}$ | Hash puzzle nonce value of block; Equation 8 |
| $h_j^{[n]}$ | Hash value of Equation 9 |
| $w_j^{[n^*]}$ | Target value of transaction requested to be modified $t_j^{[n^*]}$; Equation 4 |
| $p_j^{[n^*]}$ | Requested content for content $m_j^{[n^*]}$ of transaction requested to be modified $t_j^{[n^*]}$ |
| TMC | Transaction modification command |
| $S_{TMC}$ | Signature of interested parties for TMC |

METHOD AND APPARATUS FOR BLOCKCHAINS WITH MODIFIABLE RECORDED TRANSACTIONS

CROSS REFERENCE TO RELATED APPLICATION

This application claims the priority benefit of Korean Patent Application Nos. 10-2019-0008301 filed on Jan. 22, 2019, 10-2019-0033315 filed on Mar. 25, 2019, 10-2019-0047725 filed on Apr. 24, 2019, and 10-2019-0047726 filed on Apr. 24, 2019, in the Korean Intellectual Property Office, the disclosure of which is incorporated herein by reference.

BACKGROUND

1. Field of the Invention

The present disclosure, which relates to a method and apparatus for blockchains with modifiable recorded transactions, is about a technology that transactions already recorded on blockchains may be modified according to due process without changing connection structure of blockchains.

This research was funded by Institute of Information & Communications Technology Planning & Evaluation (IITP) grant subsidized by the Korea government (Ministry of Science and ICT). (No. 2019-0-00250, Development of Decentralized Blockchains with Modifiable Transactions).

2. Description of Related Art

Blockchain (distributed ledger recorded and managed by jointly participants of distributed network instead of managing transaction history in a central server or a common name for technologies that make it possible) model calculates and adds new blocks (ledger in which much transaction history is recorded) every designated time (every 10 min in case of bitcoin) to blockchains similar to bitcoin, and it is supposed that there exists cryptocurrency which is paid in compensation for the calculation. Here, the designated time is rotation, and by using n(n=0, 1, . . . ) indicating progression of sequential rotation, it is indicated that the rotation is $Rd^{[n]}$, block added in the rotation is $B^{[n]}$, blockchain in which the block $B^{[n]}$ is added is $BC^{[n]}$. By using these symbols, when the rotation $Rd^{[n]}$ proceeds, blockchain that each node (individual device participating blockchain network, e.g.: computer of participant) has may be represented as $BC^{[n-1]}$. It is not that the block should be added every rotation, but for convenience of description, it is supposed that exactly one block is added every rotation. In summary of the contents so far, the following symbols may be represented.

$Rd^{[n]}$: nth rotation
$B^{[n]}$: block added in rotation $Rd^{[n]}$
$BC^{[n-1]}$: blockchain of each of nodes in rotation $Rd^{[n]}$
$BC^{[n]}$: blockchain connecting block $B^{[n]}$ to blockchain $BC^{[n-1]}$ Data of block $B^{[n]}$ consists of a hash valve $h^{[n-1]}$ of the right preceding block $B^{[n-1]}$, transactions $t_i^{[n]}$, $i=1, \ldots, c^{[n]}$ to be included in the current block, a hash value $h^{[n]}$ of the current block, a nonce value $r^{[n]}$ used to obtain the hash value, and the like. Here, the term transaction, which follows practices of bitcoin, may be transaction history of actual electronic money according to services provided by blockchains, or mixture of various information including personal information.

The hash value $h^{[n]}$ and the nonce value r in blockchains of bitcoin are defined with solution of the following proof-of-work.

Proof of Work

For given $h^{[n-1]}, t_1^{[n]}, \ldots, t_{c^{[n]}}^{[n]}$, calculate the nonce value r satisfying Equation 1.

$$H(h^{[n-1]} \| t_1^{[n]} \| \ldots \| t_{c^{[n]}}^{[n]} \| r) \in Y_{0_M} (1 \le M \le 256) \quad \text{[Equation 1]}$$

Here, '$\|$' means concatenation of bit string, H is SHA-256 hash function generating 256 bit string as output for any input, and it means set of bit string that the first $|X|$ bit is X among bit string consisting of $0_M$=M 0 only and, $Y_x$=256 bit string ($|X|$=length of bit string X).

In other words, $Y_{0_M}$ is set of bit strings that first M bits are all 0 among 256 bit string. Equation 2 which is a result for nonce value $r^{[n]}$ satisfying hash puzzle of Equation 1 is a hash value of block $B^{[n]}$.

$$h^{[n]} = H(h^{[n-1]} \| t_1^{[n]} \| \ldots \| t_{c^{[n]}}^{[n]} \| r^{[n]}) \quad \text{[Equation 2]}$$

FIG. 1 illustrates data table included in block $B^{[n]}$

A coefficient M of Equation 1 determines difficulty of hash puzzle, and as the value is bigger, calculating a nonce value satisfying the corresponding hash puzzle is more difficult. A miner (it indicates node participating proof-of-work) who first calculates solutions $r^{[n]}$, $h^{[n]}$ of hash puzzle in rotation $Rd^{[n]}$ presents block $B^{[n]}$, connects it to blockchain $BC^{[n-1]}$ and expands its own blockchain $$BC^{[n]} = BC^{[n-1]} \| B^{[n]} \quad \text{[Equation 3]}$$

Other participants verify the presented block $B^{[n]}$, and as an agreement on this, update their blockchains to $BC^{[n]}$.

Modification for already recorded past transactions is actually impossible in blockchains of bitcoin. For example, to verify that blockchain in which transaction $t_j^{[n^*]}$ included in block $B^{[n]}$ already connected to blockchain was changed to transaction $\tilde{t}_{j^{[n^*]}}$ is valid, the solutions $r^{[n^*]}$, $h^{[n^*]}$ of hash puzzle of block $B^{[n^*]}$ should be recalculated for the modified transaction $\tilde{t}_{j^{[n^*]}}$. This itself requires much calculation, but the solutions $r^{[n^*+1]}$, $h^{[n^*+1]}$ of hash puzzle of the next block $B^{[n^*+1]}$ should be also recalculated corresponding to the change of the hash value $h^{[n^*]}$ in block $B^{[n^*]}$. This calculation is also needed in the next block. In this way, the hash puzzle should keep being resolved, and this is very difficult even if n* is only one less than the current rotation number n, but if there are more difference (e.g., n−n*≥6), it is actually impossible. For this reason, it is actually impossible to modify past transactions in the existing blockchains.

SUMMARY

At least one example embodiment provides a modification method for transaction modification demand justly requested in a decentralized node structure guaranteeing dispersibility which is an advantage of blockchains.

At least one example embodiment provides a method for modifying transactions already recorded on blockchains according to due process without changing connection structure of blockchains, and it helps expansion of application area of blockchains.

Particularly, at least one example embodiment provides blockchains which may comply with Personal Information Protection Act requiring deletion or modification of already recorded transaction history according to reasonable demand of interested parties.

Also, at least one example embodiment provides transparency, security, and improved traceability for recorded transaction contents which are advantages of the existing blockchains and simultaneously makes transactions modifiable by joint effort of decentralized participants such as in the existing blockchains without for any central manager.

Also, at least one example embodiment provides a method for generating hierarchical blockchains consisting of one main-blockchain and a plurality of sub-blockchains by participating of decentralized network nodes.

The sub-blockchains may consist of various different blockchains such as blockchains dealing with transaction modification classified by difficulty, blockchains related to cryptocurrency different from cryptocurrency used in the main-blockchain, blockchains dealing with special types of transactions like smart transactions and the like, blockchains taking charge of record of specific data, and the like.

The main-blockchain is used to obtain an effect of recording data recorded on the sub-blockchains on the main-blockchain by connecting several sub-blockchains to the main-blockchain along with transaction approval.

The proposed multiple blockchains provide flexibility to use each different proof-of-work and cryptocurrency by each of sub-blockchains by classifying transactions by difficulty, type, or purpose of proof-of-work.

The at least one example of embodiment helps expansion of application area of blockchains by applying a method for modifying transactions recorded on the main-blockchain according to due process without changing connection structure of blockchains to several transactions. Particularly, the at least one example of embodiment provides blockchains which may comply with Personal Information Protection Act requiring deletion or modification of already recorded transaction history according to reasonable demand of interested parties.

The technology of the present invention provides transparency, security, and improved traceability for recorded transaction contents which are advantages of the existing blockchains and simultaneously makes transactions modifiable by joint effort of decentralized participants such as in the existing blockchains without for any central manager.

Also, transaction approval and transaction modification may be performed in integrated blockchain mining by joint effort of decentralized participants such as in the existing blockchains.

For a method for transaction management based on blockchains executed in a computer system, the computer system includes at least one processor configured to execute computer-readable instructions included in a memory, and the method for transaction management based on blockchains, which is performed by the at least one processor, includes performing mining of blocks by separating approval and modification of transactions by using transaction approval blocks for verifying approval of transactions and transaction modification blocks for verifying modification of transactions.

According to an aspect of at least one example of embodiment, the performing mining of blocks may include setting a target value for transactions so that the transactions may be modified in a calculation process of the transaction approval blocks.

According to another aspect of at least one example embodiment, the performing mining of blocks may further include verifying works for the transaction approval blocks by using hash puzzle for the target value.

According to another aspect of at least one example embodiment, the performing mining of blocks may further include including a digital signature of a miner for the target value in corresponding blocks to prevent forgery of the target value.

According to another aspect of at least one example embodiment, the performing mining of blocks may further include verifying works for the transaction modification blocks by using hash puzzle for a target value of transactions requested to be modified.

According to another aspect of at least one example embodiment, the performing mining of blocks may further include updating blockchains by modifying already recorded transactions by adding the transaction modification blocks in which transaction modification commands are included to blockchains.

For a method for multiple blockchains executed in a computer system, the computer system includes at least one processor configured to execute computer-readable instructions included in a memory, the method for multiple blockchains, which is performed by the at least one processor, includes calculating a target value for transactions depending on difficulty after determining the difficulty of proof-of-work which is needed for modification according to contents or types of each of the transactions; and performing transaction approval through proof-of-work for the target value so that the transactions may be modified.

According to an aspect of at least one example embodiment, the performing is for generating hierarchical blockchains consisting of one main-blockchain and a plurality of sub-blockchains, and the sub-blockchains may be blockchains for dealing with transaction modification classified by difficulty, and the main-blockchain may connect the sub-blockchains to the main-blockchain along with transaction approval and record data recorded on the sub-blockchains to the main-blockchain.

According to another aspect of at least one example embodiment, the performing, which is for generating hierarchical blockchains consisting of one main-blockchain and a plurality of sub-blockchains, may include connecting the sub-blockchains consisting of modification commands for transactions requested to be modified depending on the difficulty of proof-of-work to the main-blockchain.

According to another aspect of at least one example embodiment, the connecting may include connecting the sub-blockchains to the main-blockchain by connecting the sub-blockchains to block in which a hash value of the main-blockchain satisfies a specific condition.

According to another aspect of at least one example embodiment, the connecting may include applying modification commands for specific transactions recorded on the sub-blockchains to whole blockchains and updating it by connecting the sub-blockchains to the main-blockchain.

According to another aspect of at least one example embodiment, the performing may further include using a different method for proof-of-work and cryptocurrency by each of the sub-blockchains.

According to another aspect of at least one example embodiment, the performing may further include connecting inferior blockchains consisting of modification commands for transactions for which modification is requested in the sub-blockchains as the sub-blockchains are used for transaction approval.

For a method for mining blocks executed in a computer system, the computer system includes at least one processor configured to execute computer-readable orders included in a memory, and the method for mining blocks, which is performed by the at least one processor, includes performing mining blocks combining approval and modification of transactions by using transactions separated into a first state (approval) where there is no change after given transactions are approved and recorded on blockchains, a second state (modification) where after given transactions are modified, it is approved and recorded on blockchains, and a third state (command) consisting of commands for modifying transactions recorded on blockchains.

According to an aspect of at least one example embodiment, the performing mining blocks combining approval and modification of transactions may include generating transactions consisting of transaction modification commands by using hash puzzle for a target value of transactions requested to be modified.

According to another aspect of at least one example embodiment, the performing mining blocks combining approval and modification of transactions may include modifying and updating the transactions requested to be modified by combining the transactions consisting of transaction modification commands and other transactions into one block and adding the mined block to blockchains.

According to another aspect of at least one example embodiment, the performing mining blocks combining approval and modification of transactions may include calculating a target value for each of transactions; and modifying transactions recorded on blockchains by using hash puzzle for the target value.

According to another aspect of at least one example embodiment, the modifying transactions recorded on blockchains may include performing transaction modification proof-of-work of corresponding transactions by using hash puzzle for a target value of transactions requested to be modified.

According to another aspect of at least one example embodiment, the modifying transactions recorded on blockchains may further include modifying and updating transactions requested to be modified by adding blocks including transactions consisting of transaction modification commands to blockchains.

According to another aspect of at least one example embodiment, the performing mining blocks combining approval and modification of transactions may further include including a digital signature of a miner for the target value in corresponding blocks to prevent forgery of the target value.

A computer system includes at least one processor configured to execute computer-readable instructions included in a memory, and the at least one processor, which manages transactions based on blockchains, performs mining of blocks by separating approval and modification of transactions by using transaction approval blocks for verifying approval of transactions and transaction modification blocks for verifying modification of transactions.

A computer system includes at least one processor configured to execute computer-readable instructions included in a memory, and the at least one processor, which manages transactions based on blockchains, calculates a target value for transactions depending on difficulty after determining difficulty of proof-of-work needed for modification according to contents or types of each of the transactions and performs transaction approval through proof-of-work for target value so as the transactions may be modified.

A computer system includes at least one processor configured to execute computer-readable instructions included in a memory, and the at least one processor, which manages transactions based on blockchains, performs mining blocks combining approval and modification of transactions by using transactions separated into a first state (approval) where there is no change after given transactions are approved and recorded on blockchains, a second state (modification) where after given transactions are modified, it is approved and recorded on blockchains, and a third state (command) consisting of commands for modifying transactions recorded on blockchains.

According to example embodiments, it may expand of application area of blockchains by providing modifiability for already recorded transactions, and particularly when deletion of personal information in transaction history is required by regulations related to Personal Information Protection Act, it may be technically solved.

According to example embodiments, it may help expand application area of blockchains by applying modifiability for already recorded transactions to multiple transactions.

According to example embodiments, it may increase availability of services (personal information, finance, and the like) in which blockchain technology is applied by providing modifiability (reversibility) of data recorded on blockchains without destroying decentralization which is core value of blockchain technology, and it may solve legal problems for personal information.

According to example embodiments, it may solve application area constraints due to technical limitation (irreversibility) of presently provided blockchains, and it may maximize availability through satisfying requirements for modifiable blockchains in FinTech/finance and enterprise application environment.

According to example embodiments, it may maintain and guarantee main properties of blockchains through providing decentralized function in which all community peer nodes participate in agreement process unlike the existing private or permissioned blockchain technologies in terms of decentralization.

According to example embodiments, it may adjust the same level of difficulty as adding blocks through mining in the existing blockchains in terms of security, in the regard that modification is a problem that one individual node (individual) may not do and whole community should participate.

According to example embodiments, it may provide flexibility to use each different proof-of-work and cryptocurrency by each of sub-blockchains by classifying transactions by difficulty, type, or purpose of proof-of-work and technology for connecting various blockchains to one main-blockchain and managing it.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which:

FIG. 1 illustrates data table included in block of the existing blockchain model;

FIG. 2 illustrates data table of transactions included in transaction approval block according to an example of embodiments;

FIG. 3 illustrates data table of transaction approval block for verifying transaction approval according to an example of embodiments;

FIG. 4 illustrates data table of transaction modification block for verifying transaction modification according to an example of embodiments;

FIG. 6 illustrates table representing detailed contents of block of main-blockchain according to an example of embodiments;

FIG. 7 illustrates table representing detailed contents of transaction modification block of blockchain model according to an example of embodiments;

FIG. 12 illustrates data table representing detailed contents of recorded transaction according to an example of embodiments;

FIG. 13 illustrates data table representing detailed contents of presented block according to an example of embodiments;

FIG. 14 illustrates data table representing contents of transaction consisting of modification commands according to an example of embodiments.

DETAILED DESCRIPTION

Figure 5:
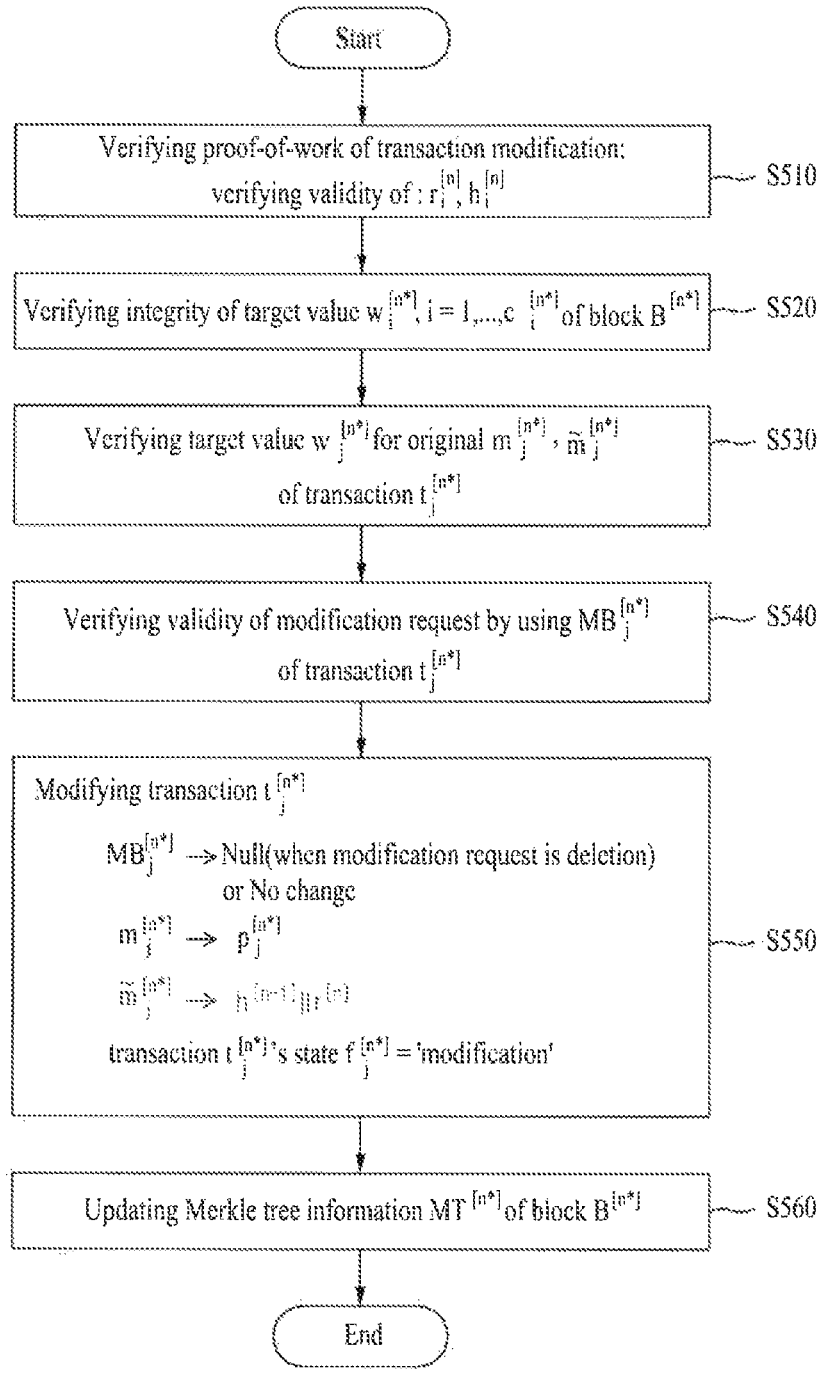
FIG. 5 is a flow chart illustrating transaction modification process of transaction modification block according to an example of embodiments.

Hereinafter, some example embodiments will be described in detail with reference to the accompanying drawings.

In example embodiments, blockchains in which transactions already recorded on blockchains are modifiable are proposed. For this, in example embodiments, two different types of blocks are used, and one is "block for verifying approval of transactions" (naming this as 'transaction approval block') and the other one is "block for verifying modification of transactions" (naming this as 'transaction modification block').

In blockchains in which transactions are modifiable, as a proposed method in which recorded transactions may be modifiable, proof-of-work depending on a target value $w_1^{[n]}, \ldots, w_{c^{[n]}}^{[n]}$ of transaction is used instead of proof-of-work directly depending on transaction.

For this, detailed contents of transaction $t_i^{[n]}$ are defined first.

First, the transaction $t_i^{[n]}$ included in transaction approval block $B^{[n]}$ consists of data table illustrated in FIG. 2.

Here, $f_i^{[n]}$, which indicates state of transaction $t_i^{[n]}$, displays that the corresponding transaction is 'approval' or 'modification', $m_i^{[n]}$ includes contents (substantive transaction contents, digital signature, personal information, and the like) of transaction $t_i^{[n]}$, and $MB_i^{[n]}$ includes information (e.g., public keys of interested parties) of interested parties of transaction $t_i^{[n]}$. Here, the interested parties mean subjects that may require deleting or modifying the corresponding history according to due process after transaction $t_i^{[n]}$ is approved. Finally, $\tilde{m}_i^{[n]}$ is additional data for solution of transaction modification hash puzzle which will be described later. When transaction is first approved, $\tilde{m}_i^{[n]}$ is blank bit string null. In practical application, length information that may distinguish $f_i^{[n]}, MB_i^{[n]}, m_i^{[n]}, \tilde{m}_i^{[n]}$ should be included, but the corresponding contents may be easily inferred, so it is omitted for convenience of description.

In the above described blockchains, like displaying state of transaction, information displaying state of block $B^{[n]}$ (in this case, it is 'transaction approval') should be included in block. In the proposed method, it is supposed that types of work that should be performed every rotation according to set rule, i.e., whether state of block is 'transaction approval' or 'transaction modification' follows predetermined rule (e.g., two times 'transaction approval' and then one time 'transaction modification').

The state of block is not changed after it has been determined when the block was generated. The meaning that the state of block is 'transaction approval' means that the corresponding block is used for verification for approval of transactions. As the same meaning, what the state of block is 'transaction modification' means that the corresponding block is used for verification for modification for certain specific transactions. Also, public key of miner of block $B^{[n]}$ is included in block.

At this time, when the present rotation $Rd^{[n]}$ is the rotation receiving verification for transaction approval through calculation of block, for each transaction which should be included in the current block, each miner sets rules to proceed with 'target setting' process for calculating $c^{[n]}$ hash value as follows.

For given [Equation 4]

$$h^{[n-1]}, m_1^{[n]}, \ldots, m_{c^{[n]}}^{[n]}, \tilde{m}_{1^{[n]}}, \ldots, \tilde{m}_{c^{[n]}[n]}$$

for $i = 1, \ldots, c^{[n]}$ $$w_i^{[n]} = H_K(h^{[n-1]} \| \tilde{m}_{i[n]} \| m_i^{[n]})$$

Here, $c^{[n]}$ is the number of transactions included in block $B^{[n]}$ and in case of the first approved transaction $t_i^{[n]}$, it is noted that $\tilde{m}_i^{[n]}(i=1, \ldots, c^{[n]})$ are all blank bit strings (although they are blank bit strings, they are included to maintain unity in target value verification procedure). Also, $H_K$ is defined as Equation 5.

$H_K(x)$=first $K$ bit string of hash value $H(x)$
  ($1 \leq K \leq 256$) [Equation 5]

In other words, for any bit string x, it is defined to satisfy $H(x) \in Y_{H_K(x)}$.

As a result of target setting, since each of miners may gather different transactions, different 'target values' $w_1^{[n]}, \ldots, w_{c^{[n]}}^{[n]}$ may be calculated.

These target values, as data will be used to verify validity of transaction modification, should be prevented from forgery. For this, digital signature of miner for target value is included in block as Equation 6.

$S_w = DS(H(w_1^{[n]} \| \ldots \| w_{c^{[n]}}^{[n]}))$ [Equation 6]

Here, DS means a function for digital signature of miner, and its validity may be confirmed by using miner's public key recorded on block.

Miners who finish target setting challenge proof-of-work (transaction approval) of Equation 7.

For given $h^{[n-1]}, w_1^{[n]}, \ldots, w_{c^{[n]}}^{[n]}$, [Equation 7]

Calculate nonce value r satisfying $H(h^{[n-1]} \| w_1^{[n]} \| \ldots \| w_{c^{[n]}}^{[n]} \| r) \in Y_{0_M} (1 \leq M \leq 256)$.

As a result for nonce value $r^{[n]}$ satisfying Equation 7, $h^{[n]} = H(h^{[n-1]} \| w_1^{[n]} \| \ldots \| w_{c^{[n]}}^{[n]} \| r^{[n]})$ is calculated as hash value of the corresponding block $B^{[n]}$. A miner who first calculates hash value of block presents block $B^{[n]}$, and connects it to blockchain and updates to expanded blockchain $BC^{[n]}$. Other participants verify the presented block $B^{[n]}$ and, as an agreement on this, update their block chains to $BC^{[n]}$ The table of FIG. 3 shows details of Block $B^{[n]}$ presented to verify of transaction approval.

Regarding contents added in the table of FIG. 3 needed in the blockchain of the present invention by comparing with the table contents of FIG. 1 needed in the existing blockchain, first, difficulty coefficient K (referring to Equation 5) and state of block are added. Since proof-of-work of the present rotation is 'transaction approval', it is determined to 'state of block=transaction approval'. Also, the miner's public key is added to header. Transaction $t_i^{[n]}$ is more subdivided and recorded as described in the data table of FIG. 2. When transaction approval block $B^{[n]}$ is generated, state $f_i^{[n]}$ of transaction is 'approval' for $t=1, \ldots, c^{[n]}$, and since additional data $\tilde{m}_{t^{[n]}}$ is not needed for solution of transaction modification hash puzzle, $\tilde{m}_{t^{[n]}}$ is blank bit string, i.e., Null.

The point of the method for blockchain modification according to an example of embodiments is clearly evident in comparison with Equation 1 and Equation 7. Hash value $h^{[n]}$ of the existing method for proof-of-work directly depends on all transaction $t_i^{[n]}$, $i=1, \ldots, c^{[n]}$, but transaction approval proof-of-work in the proposed method is defined to depend on $w_i^{[n]}$, $i=1, \ldots, c^{[n]}$ (referring to Equation 4 and Equation 5) which is part (this is named as 'target value', $w_1^{[n]}, \ldots, w_{c^{[n]}}^{[n]}$) in hash value of transaction. This is designed for deletion and modification of transaction.

Next, a method for modifying transaction is described.

First, let's suppose that the present rotation $Rd^{[n]}$ is a rotation for verifying transaction modification through calculation of block. In this rotation, each of miners selects one of transactions requested to be modified according to due process (e.g., valid request of interested parties demanding modification of the corresponding transaction). At this time, let's suppose that a transaction that a certain miner (this is called as 'Miner A') selects is $t_j^{[n^*]}$ recorded on block $B^{[n^*]}$. Here, let's define a rule that ensures a sufficient difference between n and n* (e.g., $n-n^* \geq 12$) in order to restrict only transactions clearly recorded on blockchain to be modifiable.

Let's suppose that original transaction content of transaction requested to be modified $t_j^{[n^*]}$ was $m_j^{[n^*]}$, but it is requested to be modify the original transaction content to $p_j^{[n^*]}$. First, it is noted that block $B^{[n^*]}$ in which transaction $t_j^{[n^*]}$ is included should be block for transaction generation. Miner A finds nonce value satisfying proof-of-work (transaction modification) of Equation 8 in order to modify content $m_j^{[n^*]}$ of transaction $t_j^{[n^*]}$ to $p_j^{[n^*]}$ while keeping hash value $h^{[n^*]}$ of block $B^{[n^*]}$ unchanging.

For given [Equation 8]

$h^{[n^*-1]}, h^{[n-1]}, p_j^{[n^*]}$,

Calculate nonce value $r$ satisfying $H(h^{[n^*-1]} \| h^{[n-1]} \| r \| p_j^{[n^*]}) \in Y_{w_j^{[n^*]}}$.

Here, $w_j^{[n^*]}$ is target value $(w_1^{[n]}, \ldots, w_{c^{[n]}}^{[n]})$ of transaction requested to be modified $t_j^{[n^*]}$. Also, let's determine that search space of nonce value is the same with search space of nonce value used in proof-of-work of transaction approval. Since nonce value $r^{[n]}$ satisfying Equation 8 satisfies $H_K(h^{[n^*-1]} \| h^{[n-1]} \| r^{[n]} \| p_j^{[n^*]}) = w_j^{[n^*]} = H_K(h^{[n^*-1]} \| \tilde{m}_j^{[n^*]} \| m_j^{[n^*]})$, if it modifies content $m_j^{[n^*]}$ of $t_j^{[n^*]}$ to $p_j^{[n^*]}$ and changes blank bit string $\tilde{m}_j^{[n^*]}$ to $h^{[n-1]} \| r^{[n]}$ (originally, $\tilde{m}_j^{[n^*]}$ which was blank bit string is changed to nonce value $h^{[n-1]} \| r^{[n]}$ which is the same with random number, and this nonce value is considered as new $\tilde{m}_j^{[n]}$), it may obtain effect for modifying transaction $t_j^{[n^*]}$ in block $B^{[n^*]} B^{[n^*]}$. At this time, block $B^{[n^*]}$ in which transaction $t_j^{[n^*]} t_j^{[n^*]}$ is modified verifies validity for original block hash value $h^{[n^*]}$. In case of deleting transaction, it corresponds to case that $m_j^{[n^*]}$ is changed to blank bit string ($p_j^{[n^*]}$=null).

Let's suppose that Miner A first completes proof-of-work for transaction modification. Miner A will present block $B^{[n]}$ for verification for transaction modification calculated by him/herself, and connect block $B^{[n]}$ to his/her blockchain and expand the blockchain. At this time, hash value of block $B^{[n]}$ may be defined as Equation 9.

$$h^{[n]} = H(h^{[n^*-1]} \| h^{[n-1]} \| r^{[n]} \| p_j^{[n^*]})$$ [Equation 9]

After other miners verify the presented block $B^{[n]}$, if the verification result is true, the miners expand their blockchains like Miner A. For this, block $B^{[n]}$ should include information for modified transaction.

FIG. 4 illustrates data table of transaction modification block $B^{[n]}$.

Block $B^{[n]}$ should include contents that the current block is for verification of transaction modification (state of block=transaction modification), information for transaction to be modified $t_j^{[n^*]}$ (included in TMC), digital signatures of interested parties of corresponding transaction for modification request of transaction (included in TMC), works which should be proceeded for modification of transaction (included in TMC), digital signature for this ($S_{TMC}$), and the like. Other participants proceed with modification of transaction, i.e., update of their own blockchains through process illustrated in FIG. 5. Of course, the blockchain will return to its original state and block $B^{[n]}$ will be ignored at the moment when even one verification is failed in the middle.

Modification process of transaction $t_j^{[n^*]}$ of block $B^{[n^*]}$ is as FIG. 5.

Step 1 (S510): Verifying proof-of-work of transaction modification, verifying validity of $r_i^{[n]}$, $h_i^{[n]}$ (Equation 8, Equation 9)

Step 2 (S520): Verifying integrity of target value $w_i^{[n^*]}$, $i=1, \ldots, c^{[n^*]}$ of block $B^{[n^*]}$ (Equation 6)

Step 3 (S530): Verifying target value $w_j^{[n^*]}$ for original $m_j^{[n^*]}$, $\tilde{m}_{j^{[n^*]}}$ of transaction $t_j^{[n^*]}$.

Step 4 (S540): Verifying validity of modification request by using $MB_{j^{[n^*]}}$ of transaction $t_j^{[n^*]}$ Step 5 (S550): Modifying transaction $t_j^{[n^*]i}$ $MB_{j^{[n^*]}} \rightarrow$ Null (when modification request is deletion) or no change $m_j^{[n^*]} \rightarrow p_j^{[n^*]}$ $\tilde{m}_{j^{[n^*]}} \rightarrow h^{[n-1]} \| r^{[n]}$ Transaction $t_j^{[n^*]}$ state $f_j^{[n^*]}$='Modification'

Step 6 (S560): Updating Merkle tree information $MT^{[n^*]}$ of block $B^{[n^*]}$ One of purposes of the present invention is proposing blockchain that may modify transactions recorded on the blockchain as the above described method, and for this, unlike the existing method, sub-blockchain is calculated by proceeding with block mining for proof-of-work of transaction modification, and main-blockchain proceeds with transaction approval. For describing this, the following symbols will be used.

$Rd^{[n]}$: nth rotation of main-blockchain $B^{[n]}$: block added in rotation $Rd^{[n]}$ $BC^{[n-1]}$: main-blockchain of each of nodes in rotation $Rd^{[n]}$ $BC^{[n]}$: main-blockchain connecting block $B^{[n]}$ to blockchain $BC^{[n-1]}$ $t_i^{[n]}$: transaction to be recorded on block $B^{[n]}$ through proof-of-work Here, it is supposed that transaction $t_i^{[n]}$ has detail information as the table of FIG. 2. In the present invention, each of miners determines a rule for proceeding with 'target setting' process in order to provide later modifiability for transaction $t_i^{[n]}$, $i=1, \ldots, c^{[n]}$ to be recorded on block $B^{[n]}$ to be generated in rotation $Rd^{[n]}$ of main-blockchain, as follows.

For given [Equation 10]

$h^{[n-1]}, m_1^{[n]}, \ldots, m_{c^{[n]}}^{[n]}, \tilde{m}_1^{[n]}, \ldots, \tilde{m}_{c^{[n]}}^{[n]}$ for $i = 1, \ldots, c^{[n]}$ $w_i^{[n]} = H_{K_i^{[n]}}(h^{[n-1]} \| \tilde{m}_i^{[n]} \| m_i^{[n]})$ Here, $c^{[n]}$ the number of transactions to be included in block $B^{[n]}$, in case of the first approved transaction $t_i^{[n]}$, $\tilde{m}_{i^{[n]}}(i=1, \ldots, c^{[n]})$ are all blank bit strings such as in Equation 4, and it is noted that although they are blank bit strings, they are included in Equation 10 in order to maintain unity in the target value verification procedure.

While, previously, the difficulty of proof-of-work for transaction modification was determined equally for all transactions by using one coefficient K, in the present invention, each different coefficient $K_i^{[n]}$ is used according to content and type of each transaction. For example, if $K_i^{[n]} = 256$ is set, it is impossible to modify the corresponding transaction $t_i^{[n]}$, if $K_i^{[n]} \approx M$ (here, M is coefficient used in proof-of-work for transaction approval, refer to Equation 7) is set, modification of transaction $t_i^{[n]}$ is modifiable by only joint effort of whole networks, and in case of $K_i^{[n]} \ll M$ (it means that $K_i^{[n]}$ is remarkably smaller than K), it is modifiable by interest parties of the corresponding transaction.

As a result of target setting, since each of miners may gather different transactions, each different 'target value' $w_1^{[n]}, \ldots, w_{c^{[n]}}^{[n]}$ may be calculated. The target value, as data to be used to verify validity of transaction modification, should be prevented from forgery. For this, like Equation 6 ($S_w = DS(H(w_1^{[n]} \| \ldots \| w_{c^{[n]}}^{[n]}))$), digital signature of miner for the target value is included in block.

Here, DS means a function for digital signature of miner, and whether it is valid or not may be confirmed by using miner's public key recorded on the block.

Miners, who finish target setting by participating block mining of main-blockchain, challenge proof-of-work (transaction approval) of Equation 11.

For given $h^{[n-1]}, w_1^{[n]}, \ldots, w_{c^{[n]}}^{[n]}$, [Equation 11]

calculate nonce value r satisfying $H(h^{[n-1]} \| w_1^{[n]} \| \ldots \| w_{c^{[n]}}^{[n]} \| r) \in Y_{O_M} (1 \leq M \leq 256)$.

A result $h^{[n]} = H(h^{[n-1]} \| w_1^{[n]} \| \ldots \| w_{c^{[n]}}^{[n]} \| r)$ for nonce value r satisfying Equation 11 is calculated as hash value of corresponding block $B^{[n]}$. A miner who first calculate hash value of block presents block $B^{[n]}$ and connects this to main-blockchain and updates it as expanded main-blockchain $BC^{[n]}$. Other participants verify the presented block $B^{[n]}$ and, as an agreement on this, update their main-blockchain to $BC^{[n]}$.

In the present invention, the procedure for connecting transaction approval proof-of-work block $B^{[n]}$ to main-blockchain BC is the same with the above described method. As above described, the difference is using different coefficient $K_i^{[n]}$ according to content and type of transaction. Also, in the present invention, it is proposed that main-blockchain handles only transaction approval. Considering this, in the present invention, detailed contents of block $B^{[n]}$ may be described as the table of FIG. 6.

Now, let's look at sub-blockchain. In the present invention, sub-blockchain which is directly connected to main-blockchain may be configured with several sub-blockchains to handle transaction modifications which are classified by difficulty, to handle transaction related to cryptocurrency which is different from cryptocurrency used in main-blockchain, to handle special type of transaction such as smart transaction, or to handle only recording of specific data. Also, each of sub-blockchains may use agreement method, block mining, and cryptocurrency which are different from main-blockchain.

Let's suppose that the number of sub-blockchains which are directly connected to main-blockchain is smaller than $2^L$. One sub-blockchain of them and block to be connected to the sub-blockchain are represented as follow symbols.

id: sub-blockchain identifier distinguished with L-bit $rd^{[id,n,k]}$: kth rotation of id-sub-blockchain to be connected to block $B^{[n]}$ $b^{[id,n,k]}$: block of id-sub-blockchain added in rotation $rd^{[id,n,k]}$ $\lambda^{[id,n,k]}$: nonce value of block $b^{[id,n,k]}$ $\mu^{[id,n,k]}$: hash value of block $b^{[id,n,k]}$ Here, id is sub-blockchain identifier distinguished with and each L-bit, and each L-bit does not need to indicate different sub-blockchain. For example, in case of L=3, it may be defined that 000, 001, 010, 011 indicate td=0, 100, 101 indicate id=1, 110 indicates id=2, and 111 indicates id=3. By doing this, generation and connection of sub-blockchain may occur at different frequency. Description of this will be right followed.

In the present invention, structure of sub-blockchain may be various forms. In the example embodiments, it is explained with the case in which sub-blockchain with identifier id is recorded with modification command for transaction recorded on main-blockchain at specific difficulty.

Sub-blockchains of the present invention generate block of id-sub-blockchain when last L-bit of hash value $h^{[n]}$ of block of main-blockchain indicates id, and have structure connected to main-blockchain. To describe this in detail, let's suppose that the last L-bit of block hash value $h^{[n]}$ of main-blockchain becomes the corresponding identifier id in $n = n_0, n_1, n_2, \ldots$ $B^{[n_0]}$ mined in rotation $Rd^{[n_0]}$ in which last L-bit of hash value $h^{[n]}$ of block of main-blockchain becomes identifier id for the first time is regarded as first block $b^{[id,n_0,0]}$ of id-sub-blockchain. In other words, nonce value $\lambda^{[id,n_0,0]}$ and hash value $\mu^{[id,n_0,0]}$ of $b^{[id,n_0,0]}$ are defined as Equation 12.

$\lambda^{[id,n_0,0]} = r^{[n_0]}$ $\mu^{[id,n_0,0]} = h^{[n_0]}$ [Equation 12]

Miners of id-sub-blockchain generate block of izd-sub-blockchain for proof-of-work for agreement for modification command of transaction recorded on block $B^{[0]}$, $B^{[1]}, \ldots, B^{[n_0]}$ of main-blockchain. For example, let's suppose that there is a request to modify content $m_j^{[n^*]}$ of transaction $t_j^{[n^*]}(0 \le n \le n_0)$ to $p_j^{[n^*]}$. For agreement on this, nonce value $\lambda^{[id,n,k]}$ and hash value $\mu^{[id,n,k]}$ of block $b^{[id,n,k]}$ are obtained through proof-of-work (transaction modification) of Equation 13.

[Equation 13]

For given $h^{[n^*-1]}, \mu^{[id,n,k-1]}, p^{[n^*]}$, calculate nonce value $\lambda$ satisfying $$H(h^{[n^*-1]} \| \mu^{[id,n,k-1]} \| \lambda \| p_j^{[n^*]}) \in Y_{w_j^{[n^*]}}.$$

Here, $w_j^{[n^*]}$ is target value (Equation 10) for transaction requested to be modified $t_j^{[n^*]}$. Since nonce value $\lambda^{[id,n,k]}$ satisfying Equation 13 satisfies $H_K(h^{[n^*-1]} \| \mu^{[id,n,k-1]} \| \lambda^{[id,n,k]} \| p_j^{[n^*]}) = w_j^{[n^*]} = H_K(h^{[n^*-1]} \| \tilde{m}_{j^{[n^*]}} \| m_j^{[n^*]})$, content $m_j^{[n^*]}$ of $t_j^{[n^*]}$ is modified to $p_j^{[n^*]}$, and if blank bit-string $\tilde{m}_{j^{[n^*]}}$ is changed to $\mu^{[id,n,k-1]} \| \lambda^{[id,n,k]}$, effect of modifying transaction $t_j^{[n^*]}$ in block $B^{[n^*]}$ may be obtained. Hash value of block $b^{[id,n,k]}$ of id-sub-blockchain consisting of the transaction modification command is $\mu^{[id,n,k]} = H(h^{[n^*-1]} \| \mu^{[id,n,k-1]} \| \lambda^{[id,n,k]} \| p_j^{[n^*]})$.

Block $b^{[id,m,k]}$ should include information for modified transaction such as table of FIG. 7.

FIG. 7 shows content of transaction modification block $b^{[id,n,k]}$. For example, it should include information for modified transaction $t_j^{[n^*]}$ (included in TMC), digital signatures of interested parties for corresponding transaction for modification request of transaction (included in TMC), works which should be proceeded for modification of transaction (included in TMC), digital signature for this ($S_{TMC}$), and the like. Here, main contents of TMC are as follows.

Figure 8:
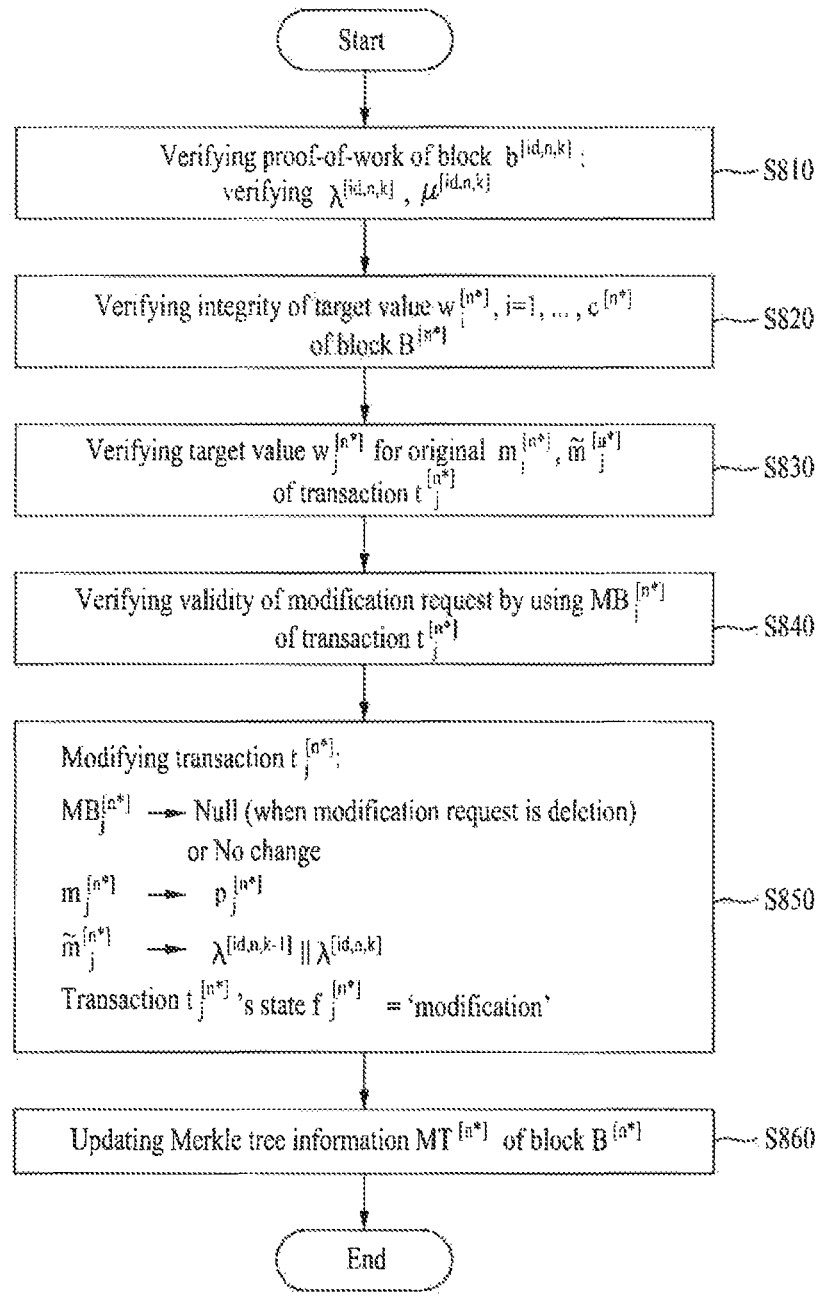
FIG. 8 is a flow chart illustrating transaction modification process of block by blockchain model according to an example of embodiments.

Process for modifying transaction $t_j^{[n^*]}$ of block $B^{[n^*]}$ by transaction modification block $b^{[id,n,k]}$ is as FIG. 8.

Step 1 (S810): Verifying proof-of-work of block $b^{[id,n,k]}$, verifying validity of $\lambda^{[id,n,k]}, \mu^{[id,n,k]}$ (Equation 13)

Step 2 (S820): Verifying integrity of target value $w_i^{[n^*]}$, $i=1, \ldots, c^{[n^*]}$ of block $B^{[n^*]}$ (Equation 6)

Step 3 (S830): Verifying target value $w_j^{[n^*]}$ for original $m_j^{[n^*]}, \tilde{m}_{j^{[n^*]}}$ of transaction $t_j^{[n^*]}$ (Equation 4)

Step 4 (S840): Verifying validity of modification request by using $MB_{j^{[n^*]}}$ of transaction $t_j^{[n^*]}$ Step 5 (S850): Modifying transaction $t_j^{[n^*]}$ $MB_{j^{[n^*]}} \to $ Null (when modification request is deletion) or No change $m_j^{[n^*]} \to p_j^{[n^*]}$ $m_j^{[n^*]} \to \mu^{[id,n,k-1]} \| \lambda^{[id,n,k]}$ Transaction $t_j^{[n^*]}$'s state $f_j^{[n^*]} = $ 'modification'

Figure 9:
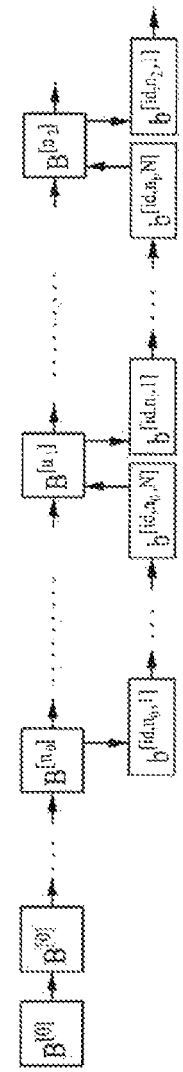
FIG. 9 illustrates an example of connecting sub-blockchain to main-blockchain according to an example of embodiments.

Step 6 (S860): Updating Merkle tree information $MT^{[n^*]}$ of block $B^{[n^*]}$ Participants of id-sub-blockchain will verify validity of block $b^{[id,n,k]}$ and then, add it to their id-sub-blockchain and expand. Such effort will proceed until last L-bit of hash value of block indicates id again in main-blockchain, i.e., until block $B^{[n_1]}$ is mined. Until then, let's suppose that blocks mined in id-sub-blockchain are $b^{[id,n_0,1]}$, $b^{[id,n_0,2]}, \ldots, b^{[id,n_0,N]}$. A miner of block $B^{[n_1]}$ in main-blockchain presents block $B^{[n_1]}$ and sub-blocks $b^{[id,n_0,1]}$, $b^{[id,n_1,2]}, \ldots, b^{[id,n_0,N]}$ in main-blockchain network, and $B^{[n_1]}$ is connected to main-blockchain $BC^{[n_1-1]}$ and updated to $BC^{[n_1]}$, sub-blocks $b^{[id,n_0,1]}, b^{[id,n_0,2]}, \ldots, b^{[id,n_0,N]}$ form side chain (referring to FIG. 9) starting at block $B^{[n_0]}$ of main-blockchain and finishing at block $B^{[n_1]}$. At this time, transaction modification commands included in sub-blocks $b^{[id,n_0,1]}, b^{[id,n_0,2]}, \ldots, b^{[id,n_0,N]}$ are applied to main-blockchain and modification of transaction is actually made.

Other miners of main-blockchain verify validity of block $B^{[n_1]}$ and sub-blocks $b^{[id,n_0,1]}, b^{[id,n_0,2]}, \ldots, b^{[id,n_0,N]}$ and then, if there is no error, they update their main-blockchain by applying transaction modification commands included in $b^{[id,n_0,1]}, b^{[id,n_0,2]}, \ldots, b^{[id,n_0,N]}$. Of course, at the moment when even one verification is failed in the middle, main-blockchain will return to its original state, and block $B^{[n_1]}$ and sub-blocks $b^{[id,n_0,1]}, b^{[id,n_1,2]}, \ldots, b^{[id,n_0,N]}$ will be ignored.

If sub-blockchain handles approval of specific type of transactions, connecting the corresponding sub-blockchain to main-blockchain means that transactions of sub-blockchain are recorded on the whole blockchains.

A miner of block $B^{[n_1]}$ receives 'connection reward' for sub-blocks $b^{[id,n_0,1]}, b^{[id,n_0,2]}, \ldots, b^{[id,n_0,N]}$ from id-sub-blockchain network along with block reward for block $B^{[n_1]}$ from main-blockchain. Meanwhile, miners of sub-blocks $b^{[id,n_0,1]}, b^{[id,n_0,2]}, \ldots, b^{[id,n_0,N]}$ receive block reward for blocks mined by them from id-sub-blockchain network. Also, hash value $h^{[n_1]}$ of block $B^{[n_1]}$ of main-blockchain is updated to $h^{[n_1]} \| u^{[id,n_0,N]}$. Here, $u^{[id,n_0,N]}$ U is hash value of last block $b^{[id,n_0,N]}$ of the connected sub-block.

Now, id-sub-blockchain will make $B^{[n_1]}$ as initial block and be newly expanded by connecting modification verification block for transaction with modification request in $B^{[n]}, 0 \le n \le n_1$, and it may be proceeded until $B^{[n_2]}$ indicating end of current id-sub-blockchain and start of the next id-sub-blockchain is mined. In this method, id-sub-blockchain is expanded and connected to main-blockchain.

Sub-blockchain may be used for approval of specific type of transactions besides modification commands. Also, transactions recorded on sub-blockchain are recorded on sub-blockchain through proof-of-work for target value for ensuring modifiability like transactions of main-blockchain are approved through proof-of-work for target value, and may add sub-blockchain for modifying it (referring to FIG. 10). In other words, hierarchical multiple blockchains may be configured. At this time, a method for generating and connecting inferior-blockchain to sub-blockchain applies and uses 'the method using last bit of hash value' used when generating and connecting sub-blockchain to main-blockchain to block hash value of sub-blockchain.

Figure 10:
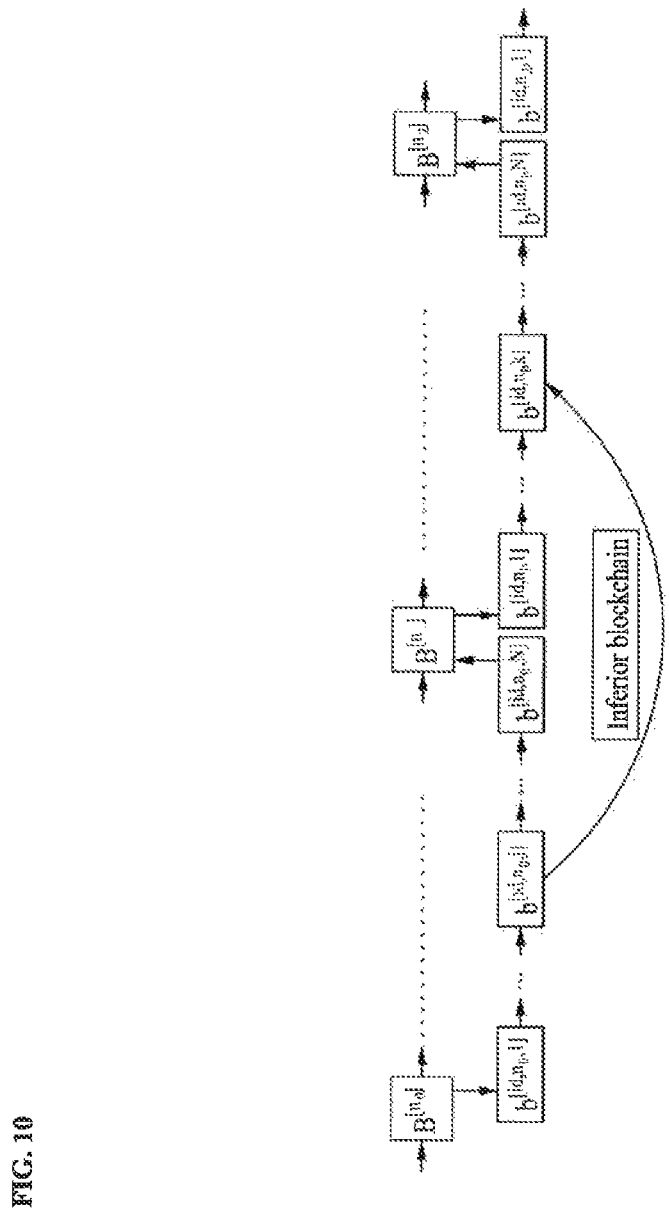
FIG. 10 illustrates an example of hierarchical multiple blockchains according to an example of embodiments.

As shown in FIG. 10, inferior-blockchain connected to sub-blockchain does not need to be connected in only one node connected to main-blockchain. id-sub-blockchain $B^{[n_0]}, b^{[id,n_0,1]}, b^{[id,n_0,2]}, \ldots, b\_^{[id,n_0,N]}, B^{[n_1]}, b^{[id,n_1,1]}, b^{[id,n_1,2]}, \ldots, b^{[id,n_1,N]}, B^{[n_1]}, \ldots$ are regarded as one independent blockchain and connected to inferior-blockchain.

In the present invention, transaction modification is not limited to only transactions recorded on main-blockchain. If any sub-blockchain is used for approval of specific type of transactions and the transactions perform proof-of-work for target value (Equation 10) instead of directly performing proof-of-work for the corresponding transaction in approval process in order to ensure modifiability, transaction modification may be performed.

Also, blockchain for transaction modification does not need to necessarily exist only below the blockchain in which transaction to be modified is recorded. If transaction to be modified is recorded on whole blockchains at the time of proof-of-work for transaction modification and proof-ofwork for target value is performed in the approval process, modification may be made regardless of the recorded position.

So far, the description has dealt with the case that main-blockchain handles transaction approval. In the present invention, it may be designed that all transactions to be approved in blockchain are approved in sub-blockchain according to their types, also sub-blockchain handling modification of transaction is classified by difficulty, and main-blockchain handles only work determining sub-blockchain to be connected to main-blockchain.

Figure 11:
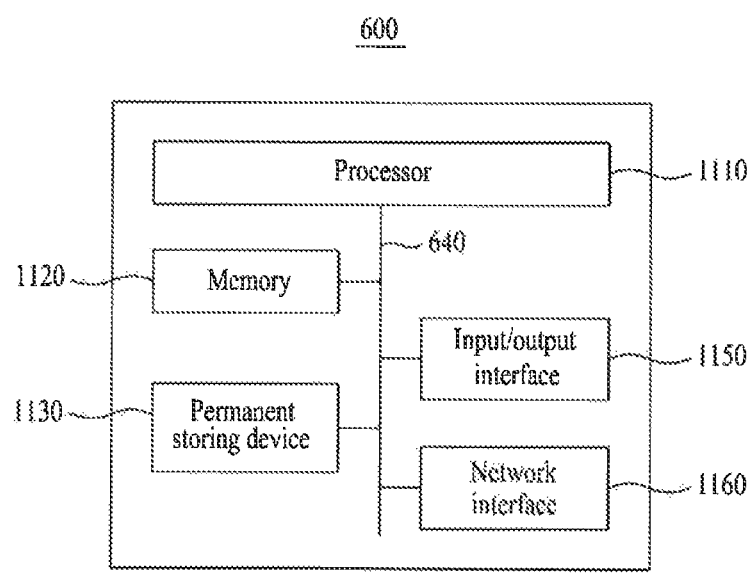
FIG. 11 is a block diagram for describing an example of internal configuration of computer system according to an example of embodiments.

FIG. 11 is a block diagram for describing an example of internal configuration of computer system according to an example of embodiments.

A system for transaction management based blockchain according to an example of embodiments may be implemented through a computer system 1100 of FIG. 11. As illustrated in FIG. 11, the computer system 1100 may include a processor 1110, a memory 1120, a permanent storing device 1130, a bus 1140, an input/output interface 1150, and a network interface 1160 as components to execute the above described method for mining block combining approval and modification of transaction.

The processor 1110 may include or be part of any device which may process sequence of commands. The processor 1110 may include, for example, a computer processor, a mobile device or a processor and/or digital processor in another electronic device. The processor 1110 may be included in, for example, a server computing device, a server computer, a set of server computers, a server farm, a cloud computer, a content platform, a mobile computing device, a smartphone, a tablet, a set-top box, and the like. The processor 1110 may be connected to the memory 1120 through the bus 1140.

The memory 1120 may include volatile memory, permanent, virtual or other memory for storing information used or outputted by the computer system 1100. For example, the memory 1120 may include RAM (Random Access Memory) and/or DRAM (Dynamic RAM). The memory 1120 may be used for storing any information such as state information of the computer system 1100. The memory 1120 may be used, for example, for storing commands of the computer system 1100 including commands for modifying transaction recorded on blockchain. The computer system 1100 may include at least one processor 1110 as needed or where appropriate.

The bus 1140 may include a communication infrastructure that enables interactions between various components of the computer system 1100. The bus 1140 may carry data between the components of the computer system 1100, for example, between the processor 1110 and the memory 1120. The bus 1140 may include wireless and/or wired communication media between the components of the computer system 1100, and may include parallel, serial or other topology arrangements.

The permanent storing device 1130 may include components such as a memory used by the computer system 1100 to store data for a certain extended period of time (e.g., compared to the memory 1120) or components such as other permanent storing devices. The permanent storing device 1130 may include non-violate main memory as used by the processor 1110 in the computer system 1100. For example, the permanent storing device 1130 may include a flash memory, a hard disk, an optical disk or other computer readable media.

The input/out interface 1150 may include a keyboard, a mouse, a microphone, a camera, a display or interfaces for other input or output devices. Inputs related to configuration commands and/or transaction modification recorded on blockchain may be received through the input/output interface 1150.

The network interface 1160 may include at least one interface for networks such as local area network or the Internet. The network interface 1160 may include interfaces for wired or wireless connections. The configuration commands may be received through the network interface 1160. And, information related to the transaction modification recorded on blockchain may be received or transmitted through the network interface 1160.

Also, in other example embodiments, the computer system 1110 may include more components than the components of FIG. 11. However, there is no need to clearly illustrate most prior art components. For example, the computer system 1100 may be implemented to include at least part of input/output devices connected with the above described input/output interface 1150 or further include other components such as a transceiver, a GPS (Global Positioning System) module, a camera, various sensors, database, and the like.

The following example embodiment relates to a method for mining block combining approval and modification of transaction in decentralized blockchain, and the method for mining block may proceed with block mining combining approval and modification of transaction by using transaction separated into a first state (approval) that after a given transaction is approved and recorded on blockchain, there is no change, a second state (modification) that after a given transaction is approved and recorded on blockchain, it is modified, and a third state (command) consisting of commands for modifying transaction recorded on blockchain. Likewise, three different types of transactions may be used and this may separate states of transactions into 'approval', 'modification', and 'command'.

In particular, when the state of transaction is 'approval', it means that since a given transaction is approved and recorded on blockchain, there is no change, when the state of transaction is 'modification', it means that a given transaction was modified according to due process at some point in the past, and when the state of transaction is 'command', it means that a given transaction is a transaction consisting of commands to modify transaction recorded on blockchain according to due process.

First, let's look at detailed contents of transaction $t_i^{[n]}$.

FIG. 12 illustrates data table for detailed contents of transaction $t_i^{[n]}$ according to an example of embodiments.

First, $f_i^{[n]}$ which indicates state of transaction $t_i^{[n]}$ indicates that the corresponding transaction is 'approval', 'modification', or 'command', $m_i^{[n]}$ a includes contents of transaction $t_i^{[n]}$ (e.g. actual transaction contents, digital signature, personal information, and the like), and $MB_{i}^{[n]}$ includes information for interested parties of transaction $t_i^{[n]}$ (e.g. public keys of interested parties). Here, the interested parties means subjects which may request to delete or modify the corresponding history according to due process after transaction $t_i^{[n]}$ is approved. Last, $\tilde{m}_{i}^{[n]}$ is additional data for solution of transaction modification hash puzzle which will be described later. $\tilde{m}_{i}^{[n]}$ is blank bit-string null when the transaction is first approved. Here, length information which may distinguish $f_i^{[n]}$, $MB_{i}^{[n]}$, $m_i^{[n]}$, $\tilde{m}_{i}^{[n]}$ should be included, but the corresponding contents may be easily inferred, so it is omitted for convenience of explanation.

In the present invention, each of miners determines rules for processing 'target setting' process for each transaction which should be included in the current block as follows.

For given [Equation 14]

$$h^{[n-1]}, m_1^{[n]}, \ldots, m_{c^{[n]}}^{[n]}, \tilde{m}_{1^{[n]}}, \ldots, \tilde{m}_{c^{[n]}{[n]}},$$

for $i = 1, \ldots, c^{[n]}$ $$w_i^{[n]} = H_k(h^{[n-1]} \| \tilde{m}_{i^{[n]}} \| m_i^{[n]})$$

Here, $c^{[n]}$ is the number of transactions to be included in block $B^{[n]}$, and it is noted that in case of first approved transaction $t_i^{[n]}$, $\tilde{m}_{i^{[n]}}(i=1, \ldots, c^{[n]})$ are all blank bit string (they are included to maintain unity in the process for target value verification although they are blank bit string). Also, $H_K$ is defined as Equation 15.

$H_K(x)$=first $K$ bit string of hash value $H(x)$
($1 \leq K \leq 256$) [Equation 15]

In other words, for any bit string x, it is defined to satisfy $H(x) \in Y_{H_K(x)}$.

As a result of target setting, since each of miners may gather different transactions, different 'target values' $w_1^{[n]}, \ldots, w_{c^{[n]}}^{[n]}$ may be calculated. The target values, as data to be used to verify validity of transaction modification, should be prevented from forgery. For this, digital signatures of miners for the target values are included in block.

$$S_w = DS(H(w_1^{[n]} \| \ldots \| w_{c^{[n]}}^{[n]}))$$ [Equation 16]

Here, DS means a function for digital signature of the miner, and its validity may be confirmed by using the miner's public key recorded on block.

Miners who finish target setting challenge proof-of-work (transaction approval) of Equation 17.

For given $h^{[n-1]}, w_1^{[n]}, \ldots, w_{c^{[n]}}^{[n]}$, [Equation 17]

calculate nonce value r satisfying $H(h^{[n-1]} \| w_1^{[n]} \| \ldots \| w_{c^{[n]}}^{[n]} \| r) \in Y_{O_M}(1 \leq M \leq 256)$.

As a result for nonce value $r^{[n]}$ satisfying Equation 17, $h^{[n]}=H(h^{[n-1]} \| w_1^{[n]} \| \ldots \| w_{c^{[n]}}^{[n]} \| r^{[n]})$ is calculated as hash value of the corresponding block $B^{[n]}$. A miner who first calculates hash value of block presents block $B^{[n]}$, connects it to blockchain, and updates to expanded blockchain $BC^{[n]}$. Other participants verify the presented block $B^{[n]}$, and as an agreement on this, updates their blockchains to $BC^{[n]}$.

A table of FIG. 13 is detailed contents of presented block $B^{[n]}$.

Regarding the contents added in the table of FIG. 13 needed in blockchain to be proposed in comparison with table contents of FIG. 1 needed in the existing blockchain, first, difficulty coefficient K (referring to Equation 15) and miner's public key pk are added. Transaction $t_i^{[n]}$ are further subdivided and recorded as described in the data table of FIG. 7. State of transaction $f_i^{[n]}$ first approved in block $B^{[n]}$ is 'approval', and since additional data $\tilde{m}_{i^{[n]}}$ for solution of transaction modification hash puzzle is not needed, a $\tilde{m}_{i^{[n]}}$ is blank bit string, i.e., Null.

Now, let's learn about a method for modifying transaction. First, let's suppose that there is a request for modifying transaction $t_j^{[n^*]}$ recorded on block $B^{[n^*]}$. Here, considering that rotation $Rd^{[n]}$ is currently in progress, it is clear $n^* < n$. Lso let's suppose that transaction requested to be modified $t_j^{[n^*]}$ had original transaction content $m_j^{[n^*]}$, but is requested to modify it to $p_j^{[n^*]}$. To achieve this, interested parties of transaction $t_j^{[n^*]}$ perform proof-of-work (transaction modification) of Equation 18.

For given $h^{[n^*-1]}, p_j^{[n^*]}$, [Equation 18]

calculate nonce value r satisfying $H(h^{[n^*-1]} \| r \| p_j^{[n^*]}) \in Y_{w_j}^{[n^*]}$.

Here, $w_j^{[n^*]}$ is target values $(w_1^{[n]}, \ldots, w_{c^{[n]}}^{[n]})$ of transaction requested to be modified $t_j^{[n^*]}$. Since nonce value $r_i^{[n]}$ satisfying Equation 13 satisfies $H_K(h^{[n^*-1]} \| r_i^{[n]} \| p_j^{[n^*]}) = w_j^{[n^*]} = H_K(h^{[n^*-1]} \| \tilde{m}_{j^{[n^*]}} \| m_j^{[n^*]})$, if transaction $t_j^{[n^*]}$, s history $m_j^{[n^*]}$ is modified to $p_j^{[n^*]}$, blank bit string $\tilde{m}_{j^{[n^*]}}$ is changed to $r_i^{[n]}$ (originally, $\tilde{m}_{j^{[n^*]}}$ which was blank bit string is changed to nonce value $r_i^{[n]}$ such as random number, and this nonce value is regarded as new $\tilde{m}_{j^{[n^*]}}$), the effect for modifying transaction $t_j^{[n^*]}$ in block $B^{[n^*]}$ may be obtained. At this time, block $B^{[n^*]}$ in which transaction $t_j^{[n^*]}$ is modified verifies validity for original block hash value $h^{[n^*]}$ If it is the case of deleting transaction, it corresponds to a case that $m_j^{[n^*]}$ is changed to blank bit string ($p_j^{[n^*]}$=null).

Now, let's learn about a process for generating transaction $t_i^{[n]}$ by gathering command for modifying transaction requested to be modified $t_j^{[n^*]}$ and related information.

First, let's regard the result satisfying Equation 18 as Equation 19.

$$h_i^{[n]} = H(h^{[n^*-1]} \| r_i^{[n]} \| p_j^{[n^*]})$$ [Equation 19]

Interested parties of transaction requested to be modified $t_j^{[n^*]}$ generate transaction $t_i^{[n]}$ by using their modification command as follow.

FIG. 14 shows data of content $m_i^{[n]}$ of transaction $t_i^{[n]}$ consisting of command modifying content $m_j^{[n^*]}$ of transaction $t_j^{[n^*]}$ to $p_j^{[n^*]}$. Here, TMC consists of commands sequentially processing the next step in the modification.

Figure 15:
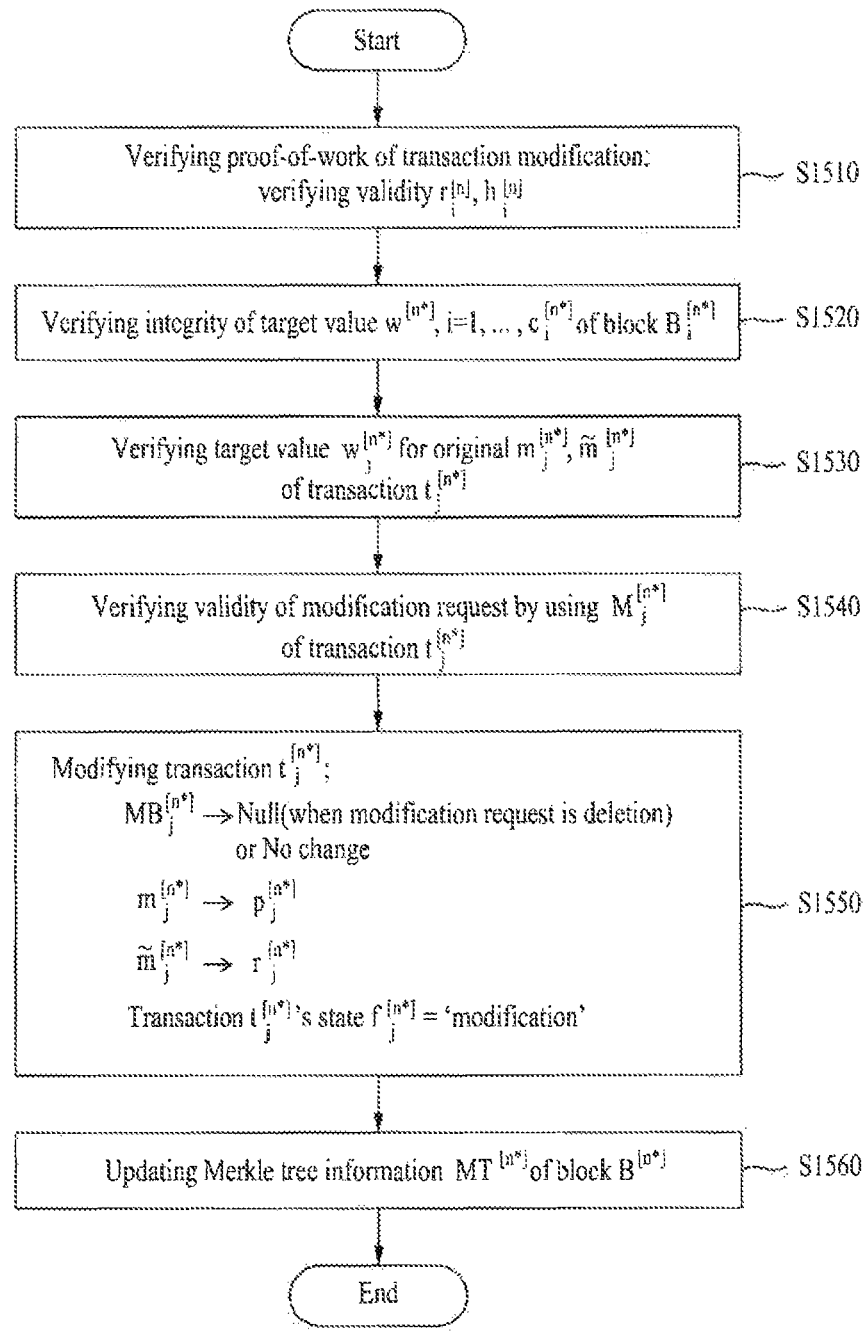
FIG. 15 is a flow chart illustrating transaction modification process of block according to an example of embodiments.

Modification process of transaction $t_j^{[n^*]}$ of block $B^{[n^*]}$ is as FIG. 15.

Step 1 (S1510): Verifying proof-of-work of transaction modification, verifying validity of $r_i^{[n]}$, $h_i^{[n]}$ (Equation 18, Equation 19)

Step 2 (S1520): Verifying integrity of target value $w_i^{[n^*]}$, i=1, \ldots, $c^{[n^*]}$ of block $B^{[n^*]}$ (Equation 16)

Step 3 (S1530): Verifying target value $w_j^{[n^*]}$ for original $m_j^{[n^*]}$, $\tilde{m}_{j^{[n^*]}}$ of transaction $t_j^{[n^*]}$ (Equation 14)

Step 4 (S1540): Verifying validity of modification request by using $mB_{j^{[n^*]}}$ of transaction $t_j^{[n^*]}$ Step 5 (S1550): Modifying transaction $t_j^{[n^*]}$
$MB_{j^{[n^*]}} \rightarrow$ Null (when modification request is deletion) or No change $m_j^{[n^*]} \rightarrow p_j^{[n^*]}$ $\tilde{m}_{j^{[n^*]}} \rightarrow r_i^{[n]}$ Transaction $t_j^{[n^*]}$'s state $f_j^{[n^*]}$='Modificaiton'

Step 6 (S1560): Updating Merkle tree information $MT^{[n]}$ of block $B^{[n-1]}$ Last, $S_{TMC}$, which is signature of interested parties for TMC, is used to verify integrity of signature of interested parties for TMC. State of transaction $t_i^{[n]}$ generated in this way is represented as $f_i^{[n]}$='command'.

In block B to be added to the present rotation $Rd^{[n]}$, there are not only approved transactions for the first time but also transactions consisting of modification command for modifying already recorded transactions. What node of network acknowledges block $B^{[n]}$ means not only adding block $B^{[n]}$ to its own blockchain but also modifying and updating its own blockchain according to command of transaction modification command transaction included in the corresponding block. Of course, blockchain will return to its original state and block $B^{[n]}$ will be ignored at the moment when even one verification is failed in the middle.

Therefore, the example embodiments proposes a method for mining blocks by combining transaction approval and transaction modification by using three different types of transactions such as transactions with no change after they are approved, transactions modified after they are approved, and transactions consisting of commands for modification of specific transactions recorded on blockchain.

At this time, target values for transactions may be calculated in order to be able to modify future transactions in calculation process of transaction approval, mining of blocks may be verified by using transaction approval proof-of-work hash puzzle for target value, and new blocks may be added to the existing blocks as proof of verification for blocks.

Also, interested parties of transactions requested to be modified may solve hash puzzle for target value of transactions requested to be modified and generate one transaction by making transaction modification command, and transactions already recorded on blockchain may be modified by updating transactions requested to be modified by adding blocks including transactions consisting of transaction modification command to the existing blockchain.

Likewise, according to example embodiments, application fields of blockchain may be expanded by providing modifiability for already recorded transactions, and when deletion of personal information in transaction history is required by Act on the Protection of Personal Information, this may be technically solved. Also, modifiability for already recorded transactions may be applied to multiple transactions, which will help to expand application fields of blockchain. Particularly, when deletion of personal information in transaction history is required by Act on the Protection of Personal Information, it may propose a method to solve this technically. Also, by classifying transactions by proof-of-work difficulty, type or purpose, it may provide flexibility to use each different proof-of-work method and cryptocurrency by each sub-blockchain and a technology for connecting various blockchains to one main-blockchain and managing it.

The units described herein may be implemented using hardware components, software components, and/or a combination thereof. For example, a processing device may be implemented using one or more general-purpose or special purpose computers, such as, for example, a processor, a controller, an ALU (arithmetic logic unit), a digital signal processor, a microcomputer, a FPGA (field programmable gate array), a PLU (programmable logic unit), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical or virtual equipment, computer storage medium or device to provide instructions or data to or be interpreted by the processing device. The software also may be distributed over network coupled computer systems so that the software is stored and executed in a distributed fashion. In particular, the software and data may be stored by one or more computer readable recording mediums.

The method according to the example embodiments may be implemented in a form of program instruction which may be performed through various computer means and recorded in computer-readable media. The media may also include, alone or in combination with the program instructions, data files, data structures, and the like. The media may be continuously storing a program which may be executed with a computer, or temporarily storing for execution or download. Also, the media may be various recording means or storing means in a form of single or a plurality of hardware which are combined, but it is not limited to a media directly accessed to any computer system, and it may be distributed on network. Examples of the media include magnetic media such as hard disks, floppy disks, and magnetic tape; optical media such as CD ROM disks and DVD; magneto-optical media such as floptical disks; and hardware devices that are specially configured to store and perform program instructions, such as ROM (read-only memory), RAM (random access memory), flash memory, and the like. Also, examples of other media include app store distributing applications or recording media and storing media managed in sites, servers, and the like distributing other many software.

While certain example embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method of blockchain transaction management, comprising:
providing a tangible, non-transient, computer-readable medium bearing instructions to configure a processor to mine blocks for use in a desired modification of a transaction recorded in a blockchain by:
using a mined transaction approval block to verify approval of the transaction; and
using a separate mined transaction modification block to verify modification of the transaction,
wherein the transaction approval block includes i) a block state indicating that the transaction approval block verifies the approval of the transaction, ii) a coefficient for determining difficulty of transaction modification, iii) a public key of miner, and iv) a target value for the transaction, and
wherein the method further comprises:
preventing forgery of the target value by including a digital signature of a miner for the target value in corresponding blocks;
verifying works for transaction modification blocks by using a hash puzzle for a target value of transactions requested to be modified; and
updating the blockchain by adding a transaction modification block to an already recorded transaction, said transaction modification block including transaction modification commands directed to the blockchain,
wherein the target value is used to enable the transaction modification and to verify validity of the transaction modification, and
wherein proof-of-work for the transaction approval block is verified via the solution of hash puzzle for the target value.

2. A method for mining blockchain blocks, comprising:
providing a tangible, non-transient, computer-readable medium bearing instructions to configure a processor to mine blocks for use in one or more transactions desired for modification said transactions recorded in one or more blockchains by:
combining approval and modification of one or more transactions via performing additional transactions, said additional transactions separated into a first state (approval) where there is no change after the additional transactions are approved and recorded on said blockchains, a second state (modification) where the additional transactions are modified after they are approved and recorded on blockchains, and a third state (command) including a command for modifying the desired transactions recorded on the one or more blockchains,
wherein the additional transactions include:
  i) first data indicating states of the additional transactions,
  ii) second data indicating contents of the additional transactions,
  iii) third data indicating interested parties of the additional transactions,
  iv) fourth data for proof-of-works of transaction modifications of the additional transactions;
wherein the first data indicates one of the first state, the second state, and the third state;
wherein when the additional transactions are initially approved, the first data indicates the first state while the fourth data is represented as blank bit strings;
wherein during the transaction modifications of the additional transactions, a request for modification is verified using the third data, the second data is modified with content of the request for modification, the fourth data is replaced with a nonce value of a hash puzzle for a target value of the additional transactions, and the first data indicates the second state, and
wherein the method further comprises:
modifying and updating transactions requested to be modified by combining the transactions requested to be modified including transaction modification commands and other transactions into one block and adding the mined block to the one or more blockchains when combining the approval and modification of transaction blocks, and
wherein the method further comprises:
calculating a target value for each transaction and modifying each transaction recorded on one or more blockchains by using a hash puzzle for the calculated target value when combining the approval and modification of transaction blocks;
preventing forgery by including a digital signature of a miner for the target value in corresponding transaction modification blocks when mining blocks combining the approval and modification of transactions; and
performing transaction modification proof-of-work for corresponding transactions by using the hash puzzle for the calculated target value when modifying the one or more transactions on the one or more blockchains.

* * * * *